US010628682B2

(12) United States Patent
Hoy et al.

(10) Patent No.: US 10,628,682 B2
(45) Date of Patent: Apr. 21, 2020

(54) AUGMENTING GESTURE BASED SECURITY TECHNOLOGY USING MOBILE DEVICES

(71) Applicant: International Business Machines Corporation, Armonk, NY (US)

(72) Inventors: Jeffrey Robert Hoy, Southern Pines, NC (US); Sreekanth Ramakrishna Iyer, Bangalore (IN); Kaushal Kiran Kapadia, Pune (IN); Ravi Krishnan Muthukrishnan, Bangalore (IN); Nataraj Nagaratnam, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/142,341

(22) Filed: Apr. 29, 2016

(65) Prior Publication Data

US 2017/0316260 A1    Nov. 2, 2017

(51) Int. Cl.
*G06K 9/00* (2006.01)
(52) U.S. Cl.
CPC ..... *G06K 9/00771* (2013.01); *G06K 9/00342* (2013.01); *G06K 2209/27* (2013.01)
(58) Field of Classification Search
CPC ..... G06K 9/00771; G06K 2009/00738; H04N 7/181

See application file for complete search history.

(56) References Cited

U.S. PATENT DOCUMENTS

| 6,317,130 | B1 | 11/2001 | Ishikawa et al. |
| 6,671,672 | B1 | 12/2003 | Heck |
| 8,478,234 | B1 | 7/2013 | Byrne |
| 8,693,726 | B2 | 4/2014 | Karakotsios et al. |
| 9,009,103 | B2 | 4/2015 | Rangarajan et al. |
| 2008/0169929 | A1* | 7/2008 | Albertson ........ G08B 13/91613 340/573.1 |
| 2010/0245583 | A1* | 9/2010 | Harel ............... G08B 13/19656 348/159 |
| 2012/0071131 | A1 | 3/2012 | Zisapel et al. |
| 2013/0116044 | A1 | 5/2013 | Schwartz |

(Continued)

OTHER PUBLICATIONS

U.S. Appl. No. 15/142,262, filed Apr. 29, 2016.

(Continued)

*Primary Examiner* — Vincent Rudolph
*Assistant Examiner* — Raphael Schwartz
(74) *Attorney, Agent, or Firm* — Jeffrey S LaBaw; John C Kennel; Gail Zarick

(57) ABSTRACT

Using mobile devices in a gesture based security system is described. An image based feed is received from a camera incorporated in a first mobile device. The first mobile device is in communication with the gesture based security system. The camera has a view of one of a plurality of secured areas monitored by the gesture based security system. A gesture is recognized within the feed. Non-gesture metadata from the mobile device is associated with the recognized gesture. The non-gesture metadata is used to determine that the image based feed is a view of a first secured area of the plurality of secured areas. The determination whether the recognized gesture is an approved gesture within the first secured area is made according to non-gesture metadata associated with the recognized gesture.

16 Claims, 7 Drawing Sheets

(56) References Cited

U.S. PATENT DOCUMENTS

| | | | |
|---|---|---|---|
| 2014/0007225 A1 | 1/2014 | Gay | |
| 2014/0310788 A1 | 10/2014 | Ricci | |
| 2014/0354820 A1 | 12/2014 | Danialian | |
| 2015/0070506 A1* | 3/2015 | Chattopadhyay | G06K 9/00718 348/159 |
| 2015/0199699 A1 | 7/2015 | Milton et al. | |
| 2016/0042767 A1* | 2/2016 | Araya | G11B 19/02 386/201 |

OTHER PUBLICATIONS

U.S. Appl. No. 15/142,209, filed Apr. 29, 2016.
Brand et al., "Discovery and segmentation of activities in video." Pattern Analysis and Machine Intelligence, IEEE Transactions on 22.8 (2000): 844-851.
Tamviruzzaman et al. "ePet: when cellular phone learns to recognize its owner." Proceedings of the 2nd ACM workshop on Assurable and usable security configuration. ACM, 2009.
Kaluza "A Unified Framework for Detection of Suspicious and Anomalous Beahvior from Spatio-Temporal Traces." Informatica 38.3 (2014).
Kotikalapudi, . Abnormal event detection in video. Diss. Indian Institute of Science Bangalore, 2007.
Aghajan et al. "Use of context in vision processing: an introduction to the UCVP 2009 workshop." Proceedings of the Workshop on Use of Context in Vision Processing. ACM, 2009.
Mohandoss, "A Novel Approach to Detect Anomalous Behavior Using Gesture Recognition", Proceedings of the Fourth International Conference on Signal and Image Processing 2012 (ICSIP 2012).
Gomez-Conde, "Simple Human Gesture Detection and Recognition Using a Feature Vector and a Real-Time Histogram Based Algorithm", Journal of Signal and Information Processing, 2011.
Web Page, http://nocamels.com/2014/04/gesture-recognition-is-not-just-for-games-israeli-tech-tracks-a-skeleton-for-biometric-authentication/xtr3d/ Retreived Apr. 24, 2016.
List of IBM Patents or Applications Treated as Related.

\* cited by examiner

AUGMENTING GESTURE BASED SECURITY TECHNOLOGY USING MOBILE DEVICES

BACKGROUND OF THE INVENTION

Technical Field

This disclosure relates generally to computer based security measures. More particularly, it relates to improving gesture based security technology.

Background of the Related Art

Security cameras in public and private spaces are becoming ubiquitous to deal with security concerns. Existing video monitoring systems have many drawbacks, in particular the need for one or more manual operators to monitor the security video in real-time security. Further, the effectiveness of the security system is largely dependent on the operators' performance. As cameras proliferate in number, the ability of human operators to analyze and address all of the input is increasingly challenged.

There have been some efforts to automate the process of analyzing security video and image feeds. Most of the efforts in automating anomaly detection have been in non-video settings, such as facial recognition. However, the limited efforts in anomaly detection in video recording of physical environments have been beset with false positives and inaccurate results.

BRIEF SUMMARY

According to this disclosure, a method, apparatus and computer program product for using mobile devices in a gesture based security system is described. An image based feed is received from a camera incorporated in a first mobile device. The first mobile device is in communication with the gesture based security system. The camera has a view of one of a plurality of secured areas monitored by the gesture based security system. A gesture is recognized within the feed. Non-gesture metadata from the mobile device is associated with the recognized gesture. The non-gesture metadata is used to determine that the image based feed is a view of a first secured area of the plurality of secured areas. The determination whether the recognized gesture is an approved gesture within the first secured area is made according to non-gesture metadata associated with the recognized gesture.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

At a high level, in preferred embodiments of the invention, the present invention augments a security system which uses gesture recognition to reduce false positives. The invention uses information such as location, image information or audio information which is collected contemporaneously with the video feed which records the gesture. The additional information is used in some embodiments of the invention to select among context profiles for gestures each of which indicates whether a recognized gesture is approved or unapproved according the sensed context. In other embodiments of the invention, the additional information is forwarded with a recognized gesture to aid in interpretation of the gesture.

Figure 1:
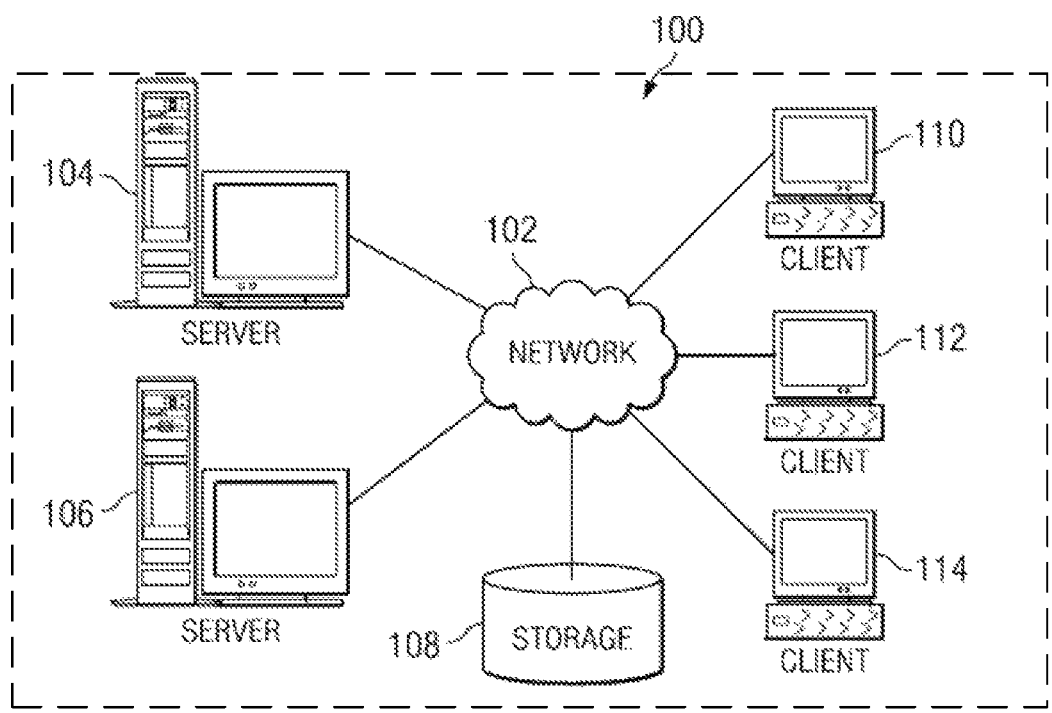
FIG. 1 depicts an exemplary block diagram of a distributed data processing environment in which exemplary aspects of the illustrative embodiments may be implemented.
Figure 2:
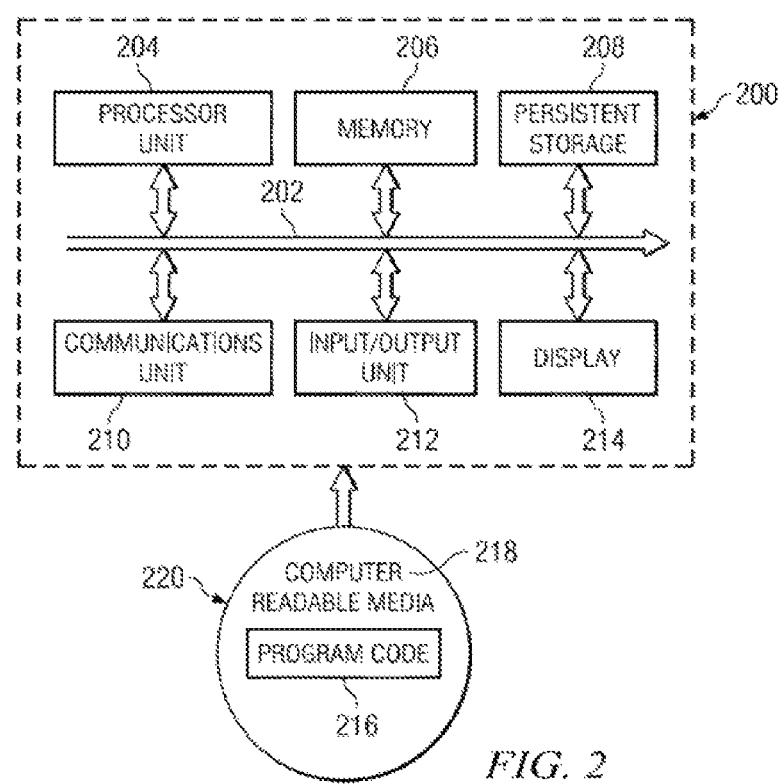
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (110) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C #, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Using the present invention, a computer implemented method for capturing facial, hand and motion gestures of individuals, i.e. targets or target individuals, viewed by one or more cameras is described. The cameras in respective embodiments of the invention include both stationary cameras such as surveillance cameras, and mobile cameras such as mobile phone or tablet cameras, cameras incorporated into wearable devices such as Google Glass or cameras mounted on a vehicle or garment. The gesture recognition technique may be selected from one of a plurality of known spatial gesture recognition techniques. The recognized gestures are augmented with non-gesture data such as image or audio which are captured contemporaneously with the video from which the gesture is recognized.

Known and unknown activities are detected with gesture recognition and classified as "approved" or "unapproved" gestures. False positives are eliminated by several techniques using non-gesture metadata. In alternative embodiments, the non-gesture metadata is used to differentiate between gestures, or to help classify a previously unknown gesture as either an "approved" or "unapproved" gesture. A knowledge base (KB) is maintained with patterns of known gestures which have been classified into approved and unapproved activities. In preferred embodiments of the invention, the KB will have a plurality of collections of approved and unapproved gestures, each respective collection for a particular location or secured area. Once the gesture is recognized, the gesture is compared to the appropriate collection to determine whether the gesture is approved or not. The appropriate collection of gestures is selected according to the non-gesture metadata in preferred embodiments. The recognized gesture is compared for its conformance to a gesture based activity known within the knowledge base as approved (or not approved) within the location in which the gesture was detected.

Image recognition is used to reduce false positives. Facial recognition or other image recognition can be used to recognize the age, gender, physical abilities or cultural characteristics of the individual performing the gesture. In preferred embodiments of the invention, the image based metadata is associated with the recognized gesture. Certain gestures are approved (or not approved) based on the age, gender, physical abilities or cultural characteristics of the individual. Thus, if the KB indicates that the gesture is approved for an individual identified by image recognition, despite being a gesture which would ordinarily give rise to an alert, a false positive is eliminated.

In embodiments of the invention, audio analysis supplements the gesture recognition, either to reduce the number of false positives, or to further help classify the recognized gesture as approved or unapproved. In preferred embodiments of the invention, an audio record is stored in the knowledge base to aid in interpreting a recognized gesture. Additionally, in preferred embodiments, natural language processing (NLP) is used in secured areas to parse the audio for speech information for gathering more details about the recognized gesture. The captured audio, i.e. the recording, is used as another source of non-gesture information to reduce the number of false positives for the recognized gestures. Instead of speech recognition, the audio can be classified by sound, e.g., a scream, laughing, a thump, etc. The audio metadata is associated with the recognized gesture in preferred embodiments.

Learning algorithms in neural networks enhance the dynamic recognition of anomalous gestures which are not recognized as either being approved or unapproved gestures in the detection area. Neural networks assist gesture recognition by scanning through video images and filtering out immovable objects (from moving/motion objects). The neural network can scan through gesture profiles for other areas of approved and unapproved gestures to find gestures which are similar or identical in terms of gesture and context and submit a candidate determination (approved, unapproved) to a security authority for a final determination.

Once the false positives have been eliminated, in preferred embodiments of the invention, the system alerts the security personnel based on the gesture recognition and analysis about any abnormal/unusual activity detected. The security personnel can either act on the detected gesture, or tag the gesture, if previously unknown, as an approved gesture. In some embodiments, the security personnel can classify the gesture in a third category as a "suspicious" gesture which is neither approved, nor unapproved. An unapproved gesture is a gesture which should immediately be acted upon, if only to provide an alert to a security authority. Suspicious gestures are put on a watch list, so that if the gestures occur repeatedly, they can be placed in a folder for analysis, and eventually classified as either approved or unapproved.

The invention has advantages over the prior art in that the security personnel have more confidence that the real-time alerts which they receive on unusual physical activities are more likely to be activities of concern, as the false positives have been eliminated. The system provides additional data, e.g., image and audio, to assist the security personnel in interpreting recognized gestures. Because there are fewer incidents reported, there are fewer incidents which security needs to act on, and for those incidents, physical security is improved. By automating physical security, the system will result in more real-time, efficient detection of possible threats and help in better incident response. Using an automated system according to principles of the present invention reduces the dependency on individuals monitoring the videos.

Embodiments of this invention could be used in security systems in outdoor areas such as ATMs. The security system can detect physical attacks. For example, using an ATM machine could be an approved activity inside ATM premises, but hitting or charging against another person is an unapproved activity inside ATM premises. Both approved and unapproved gestures recognized by gesture recognition are logged as gestures in a secured area in embodiments of the invention. If an unapproved gesture is detected, the system immediately alerts the appropriate security authorities.

Other embodiments of the invention are useful in home security monitoring systems to detect threats or break-ins. Yet other embodiments are valuable in airport security monitoring, e.g., for tracking suspicious activities and abnormal activities in secured areas in an airport. The invention has use in secured areas for detecting non-compliance of security policies in highly sensitive and highly secure areas, e.g., to detect receiving and giving of bribes. Further, the invention could be used in robotic security technology as part of monitoring modules of robotic assistance for police departments or other security organizations.

Figure 3:
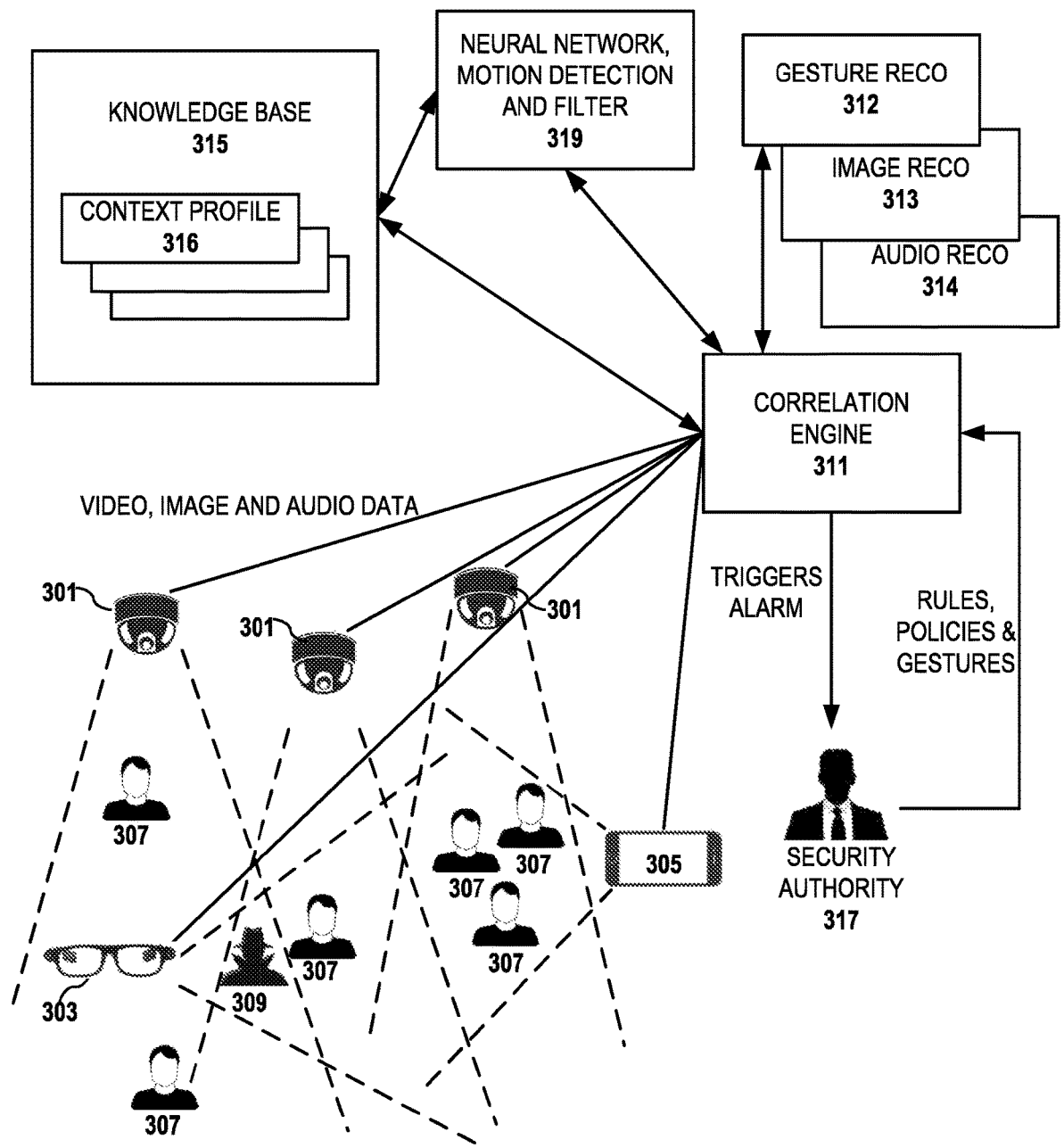
FIG. 3 illustrates an exemplary computing architecture in which the disclosed subject matter may be implemented.

FIG. 3 illustrates an exemplary computing architecture in which the disclosed subject matter may be implemented. As shown in the drawing, the system uses a plurality of monitoring devices, including both stationary devices such as surveillance cameras and microphones 301, as well as registered mobile devices such as mobile phone cameras 305 or cameras of a wearable device 303 (e.g., Google Glass). In embodiments of the invention, mobile devices register with the system prior to the system accepting input from a particular mobile device. The cameras and microphones collect information concerning a secured area which includes a plurality of well-behaved individuals 307 and a badly behaved individual 309. The video, image and/or audio data streams from the sensors are sent back to the system which includes correlation engine 311. The system includes gesture recognition unit 312, image recognition unit 313 and audio recognition unit 314. The gesture recognition unit 312 can use spatial gesture models such as 3D model-based algorithms (skeletal or volumetric) or other gesture recognition algorithms known to the art. The image recognition unit 313 includes a set of appearance based algorithms such as facial recognition processes to identify characteristics of the particular individuals in the secured area. In preferred embodiments, the audio recognition 314 includes NLP software for speech recognition. In different embodiments of the invention, the image information or the audio information will be collected or used, but not both.

Once the gestures, images and/or audio are recognized, the correlation engine 311 will request the knowledge base 315 to return the appropriate context profile 316. In preferred embodiments, the context profile 316 is selected according to location and time metadata. Optionally, the context profile can be selected according to the individual characteristics and audio data respectively recognized by the image recognition unit 313 and audio recognition unit 314, either in combination with the location and time metadata, or alone. The context profile 316 includes a set of approved gestures and/or a set of unapproved gestures. In this example, the recognized gestures of the well-behaved individuals 307 will be approved gestures, while at least some of the recognized gestures of the badly behaved individual will be unapproved gestures.

In preferred embodiments, cultural-specific, age-specific or gender-specific behaviors are stored in respective context profiles as non-anomalous behaviors (i.e. approved gestures). Thus, if an individual is recognized as belonging to a respective group, the context profile information is used to prevent false positives.

Preferred embodiments of the invention cover a plurality of secured areas, each with its own set of context profiles, each context profile having its own set of allowed gestures and/or set of unapproved gestures.

In alternative embodiments of the invention, the knowledge base 315 is arranged by recognized gesture, wherein a recognized gesture is classified as an approved gesture or an unapproved gesture according to the associated metadata.

In preferred embodiments of the invention, the gesture recognition unit 312 uses a plurality of spatial gesture models to recognize and collect hand and motion activities of individuals within proximity of monitoring device. By using a plurality of models, ranking of the correct gesture through multiple models is performed. Gesture models can be seeded through multiple sources, including manual entry, known non-anomalous behavior, and learning from the secured areas. There exist gesture recognition libraries which can be used to initialize the gesture recognition unit.

Both the image recognition unit 313 and the audio recognition unit 314 can be used to identify individuals. The individuals are identified as known or unknown. The unknown individuals could be discriminated from other individuals based on facial or physical characteristics by the image recognition unit 313 or by voice modulations and other vocal characteristics by the audio recognition unit 313. NLP data (in less crowded areas) gathered would also be sent tagged with the identified individuals' profiles to the correlation engine and could be used for additional intelligence. In embodiments of the invention, there are context profiles or gesture rules for registered individuals. Thus, the identification of an individual by the image and/or audio recognition unit will results in the individual context profile being retrieved from the knowledge base 315.

As shown in the drawing, the system uses the correlation engine 311 to receive rules and policies from a security authority 317. In this embodiment, the correlation engine 311 serves as a central module through which communication is coordinated between other parts of the system. As would be recognized by those skilled in the art, other architectures, e.g., using an API layer, could be used in other embodiments to pass information throughout the system. The security authority 317 can be an administrator skilled in computer and physical security and able to configure the system for context profiles containing sets of approved gestures and/or unapproved gestures. As is also shown, once configured and operational, the system triggers alarms or other messages to the security authority, e.g., in the event that an unauthorized or unknown gesture is detected. As the system learns the gestures which occur in the secured area, and the gestures are classified as approved or unapproved by the security authority, the invention envisions continued input from the security authority/administrator 317. Further, the role of the security authority can be split among several individuals, e.g., one individual who receives alerts and physically acts on them and another individual who configures the rules and policies and knowledge base.

The neural network motion detection and filter 319 works with the gesture recognition unit 312. The neural network 319 can assist the gesture recognition unit if a candidate gesture requires more definition, e.g., filtering out stationary objects from moving objects, drawing parallels between the candidate gesture and known gestures when the match is not exact or within a predetermined tolerance (fuzzy matching). In one preferred embodiment, the neural network can add new gestures to a set of context profiles based on learning. The security authority is consulted prior to adding a new gesture in a context profile in some embodiments.

In some preferred embodiments, any gesture patterns that do not match with approved gesture patterns in the KB 315, or the selected context profile 316 cause an alarm to be triggered to an appropriate security authority.

In some preferred embodiments, if the patterns match with approved gesture patterns in the KB 315 or profile 316, the gesture patterns enter a second round of comparison where the correlation engine correlates other information gathered (policies, age, gender, speed, cultural commonalities, etc.). The system triggers an alert if one or more of these factors overrides the rules for approved gestures. In this embodiment, the image or audio data can be used as an override of the decision that the gesture is "approved", in addition to their use in eliminating false positives.

A gesture might be an approved gesture in one secured area, but not in another. In the embodiments where the system interprets gestures in a plurality of secured areas, different sets of context profiles are used, one set for each secured area. In alternative embodiments, where the knowledge base is arranged by gestures, the same recognized gesture may have multiple entries, each with a different set of metadata and indication whether the gesture is approved or unapproved given the metadata and the location in which the gesture was performed. In embodiments where only stationary cameras are used, the sets of context profiles can be arranged by camera ID, or gestures can use camera ID metadata. However, in the mobile embodiment, where mobile devices are used to augment or replace the fixed sensors, the mobile devices could be in different respective secured areas at different times. One of the major problems is to determine which environment, i.e. which secured area, the mobile device was in, and therefore, which context profile would apply and new gestures and learning should be added. The mobile device embodiment is discussed in greater detail below in connection with FIG. 7.

Figure 4:
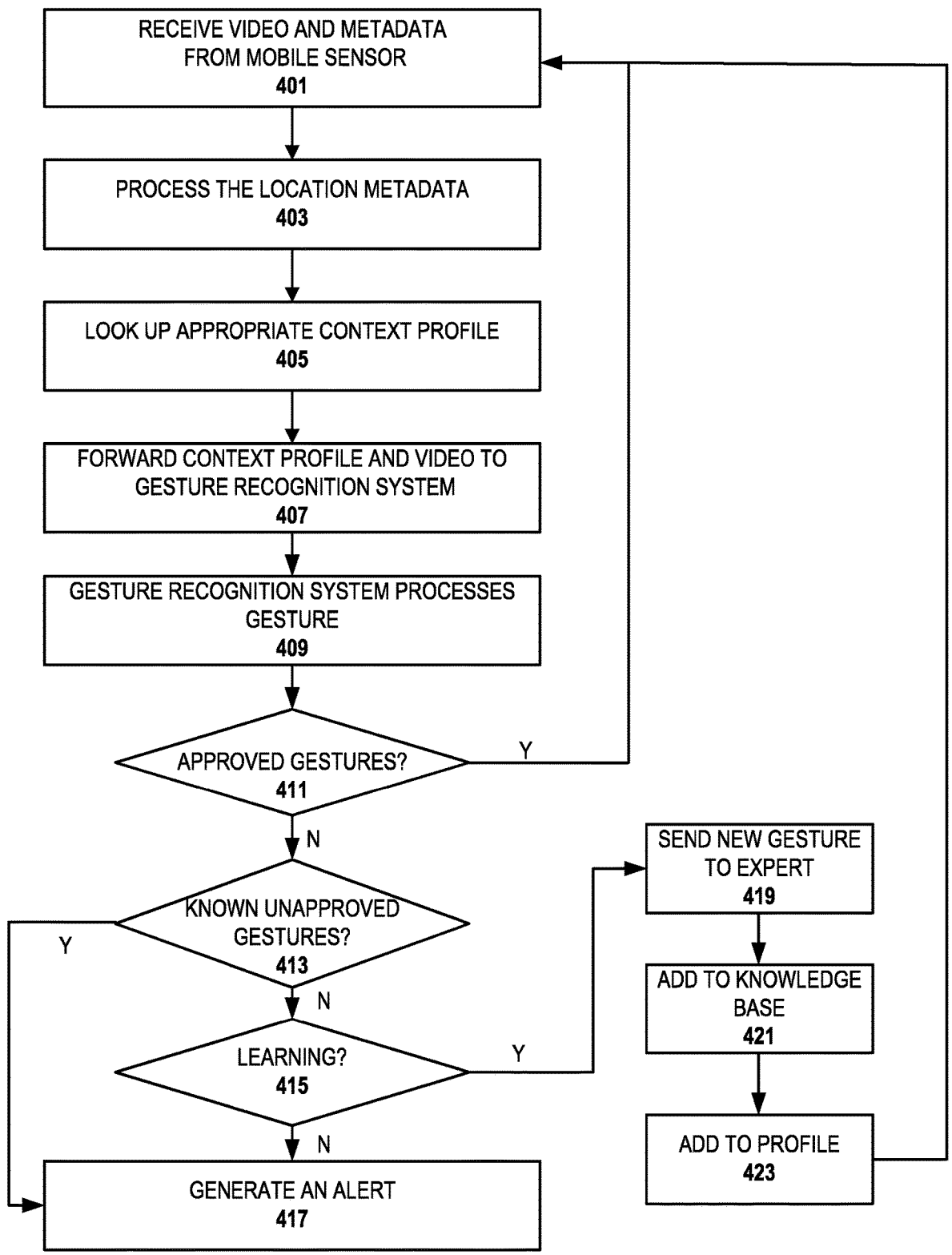
FIG. 4 is a high level flow diagram of a preferred embodiment of the invention.

FIG. 4 is a flow diagram of one preferred embodiment of the invention in which the sensors of a mobile device are used. In step 401, the system receives video/image/audio data from the sensors of a mobile device along with mobile device metadata and forwards this data to a processing module in the gesture recognition system. In embodiments of the invention, a registration step (not pictured) will precede step 401. The gesture recognition system processes the location metadata from the mobile device metadata and attaches the location metadata to the video/image/audio data in step 403. The location metadata is used to determine to which secured area the mobile device sensor output is relevant. The location metadata may have the format devLocation, devLocLatitude, devLocLongitude. In embodiments of the invention, the gesture recognition system uses the location information to query a map API to determine which secured area the mobile device is viewing. Optionally, the system determines whether the mobile device is registered to the system so that inputs only from registered, authorized mobile devices are used, e.g., to prevent privacy issues.

In step 405, the system looks up the appropriate context profile in the knowledge base according to the appropriate metadata. In this embodiment, the location is the context input used to select the context profile, e.g., either the mobile device metadata or derivative location data, e.g., the secured area from the maps API. Other embodiments use other metadata or context input for context profile selection. The system forwards the appropriate context profile and associated video/image to gesture recognition system, step 407. In this example, the secured area is "BoxingArena-Adults". Note that a particular context profile can be shared between secured areas, if they have similar functions (or type). Alternatively, a sample or template profile for a particular type of secured area can be customized for respective secured areas with similar types.

In step 409, the gesture recognition system processes the gesture so that it can be recognized. Continuing the example, the recognized gesture is "punch" i.e. a rapid movement of hands hitting another person. In most secured areas, a "punch" gesture is an unapproved gesture and would trigger an alert. In step 411, the detected punch gesture is matched with list of approved gestures in the context profile from the knowledge base. In the example, approved gestures in the boxing arena would include "punch". A refinement of the context profile could use facial recognition to identify the boxers so that "punch" would be an approved gesture for one boxer punching another boxer, but an unapproved gesture between audience members, or between an audience member and a boxer. If the gesture is an approved gesture, the system returns to accepting video and metadata from the mobile devices. Embodiments of the invention enter recognized gestures into a log file whether approved or unapproved.

In step 413, the system tests whether the gesture is unapproved. If the gesture is neither approved nor unapproved, the system determines whether it is appropriate to enter a "learning" mode, step 415. If it is not appropriate, for example, in the case of a scheduled fight (as opposed to a practice session), or if the gesture is unapproved, an alert is generated, step 417. Continuing the example, a "throwing" gesture of an audience member towards the ring would be an example of an unapproved gesture. The system may generate different types of alerts depending on the recognized gesture, the secured area or the schedule of events in the secured area. The recognized gesture together with any relevant metadata can be forwarded to the security authority with the alert. The security authority, in the case of a public area, might be the private security force contracted by the arena, or depending on the severity of the gesture, might be police authorities. If there is no specific match, the alert may take the form of a text message with an embedded image or video transmitted to a mobile device. If the recognized gesture is matched with unapproved gesture in a public area location profile, it may raise an audible alarm.

On the other hand, if it is appropriate to enter a learning mode, the newly recognized gesture (together with the metadata) is sent to an expert or the security authority, step 419. The security authority then classifies the gesture as approved or unapproved and adds the gesture to the knowledge base (step 421) in one or more context profiles (step 423). The recognized gesture may be classified as an approved gesture in one context profile, but an unapproved gesture in another context profile. In the alternative embodiments in which gestures are indexed by associated metadata, the new gesture is entered with the appropriate metadata in one or more entries indicating whether the new gesture is approved or unapproved.

Thus, as shown in FIG. 4, by using a location based context profile, false positives are reduced or eliminated.

In embodiments of the invention, image recognition can be used to reduce false positives. Using image recognition techniques, an individual can be identified as a unique individual and/or classified into a group according to physical characteristics. For example, image recognitions techniques could classify a person as "young" or "old". Such age classification would also be used as a means to reject false positives. For example, a set of gestures which would be "unapproved" for a person within most age groups would be approved for a younger or older person.

Figure 5:
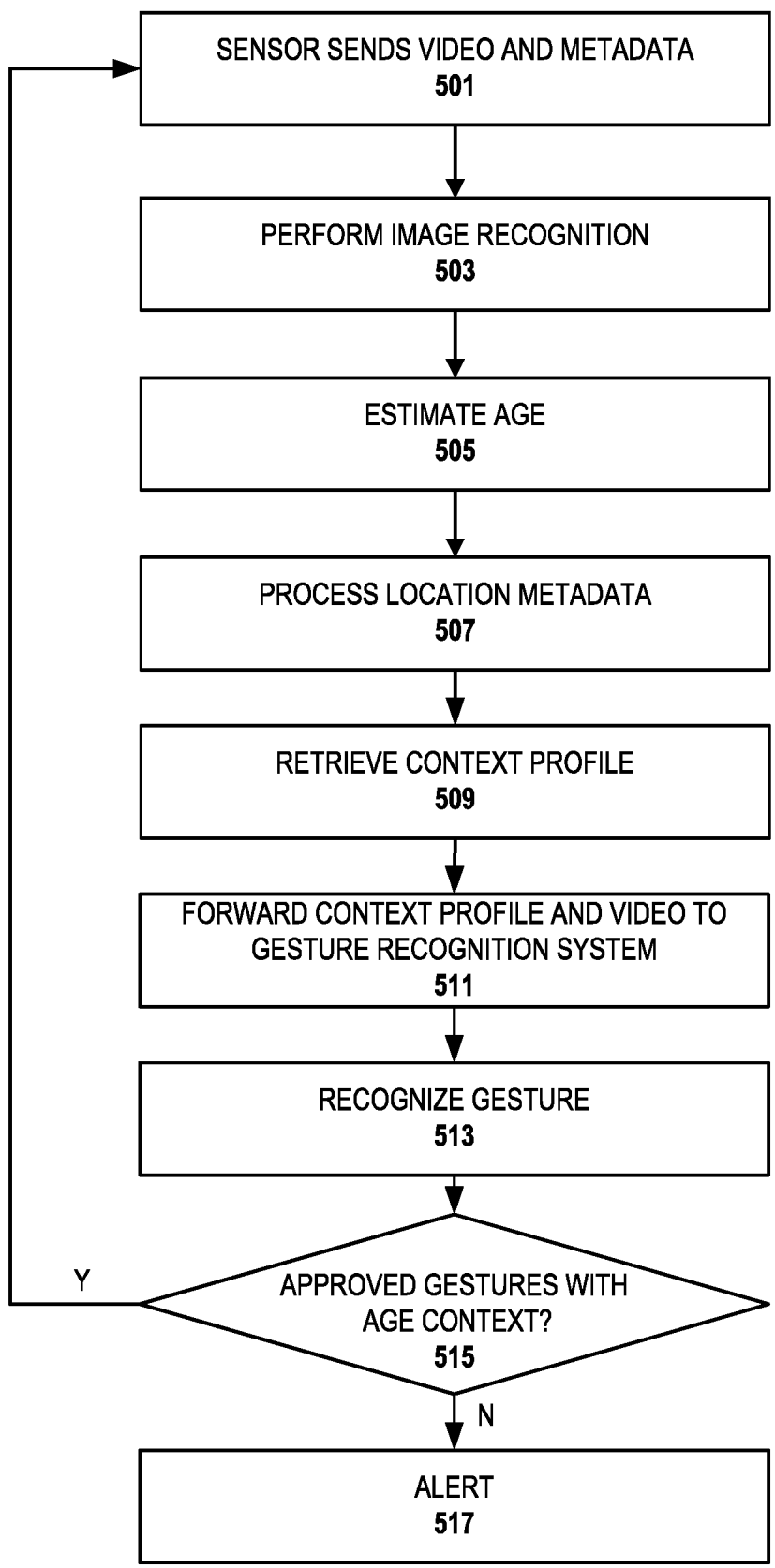
FIG. 5 is a flow diagram of another preferred embodiment of the invention.

As shown in FIG. 5, the secured area is an ATM and "hitting" is an example of gesture with would be unapproved between two adults, that is, one adult hitting the other adult, and cause the system to create an alert. However, a toddler hitting his parent at the ATM, while not welcome, would not merit creating an alert which would cause the authorities to converge on the already hassled parent. And so, in the context of the invention, this would be an example an "approved" gesture based on the age of the recognized individual.

In step 501, the input sensor sends image/video data along with metadata (location) to a processing module. The sensor could be either a mobile sensor or a stationary sensor situated with a view of the ATM. In step 503, the image recognition module performs standard image recognition techniques. The image recognition output is used to estimate the targets' ages, step 505. In preferred embodiments of the invention, the analysis of the gesture video/image can confirm that proper context profile is being applied. For example, the system uses facial recognition to continue the association of the target (target 1) identified as a "child" with the gestures. Further, gesture recognition itself can be used for estimating age by using measurements of the limbs of the target and their movement. For example, children have shorter arms than adults and different characteristic movements. Thus, in embodiments where facial recognition is used, the analysis of the gesture itself can be used to confirm the age estimate of the target.

In step 507, the location metadata in the video and image stream is separated from the overall message. Alternatively, in the case of a stationary camera, a database can be used to identify the location of the camera, and therefore, target. The system uses the estimated age(s) of the target(s) together with the location metadata to retrieve the appropriate context profile(s) in the knowledge base, step 509. In this example, the context input would be location and age. In step 511, the processing module forwards the appropriate context profile, e.g., ATM-child, and associated video/image to the gesture recognition system.

In step 513, the gesture recognition system processes the gesture video/image and identifies the gesture as "hitting" (target 1 hitting target 2). In step 515, the gesture is matched with the list of approved gestures in the context profile retrieved from the knowledge base (an approved gesture would be target 1 "child" hitting target 2 "adult", but not vice versa). If the gesture is approved, the system returns to accepting video and image input.

In alternative embodiments, wherein the knowledge base is organized by recognized gesture indexed by associated metadata, steps 509, 511 and 513 would occur in a different order, and rather than the context profile, the recognized gesture as approved or unapproved is returned.

In step 517, the system will generate an alert to an appropriate authority via a notification message or raise alarm sounds at the ATM if there is no specific match for the gesture. In other embodiments of the invention, an alert is raised only if an "unapproved" gesture is detected.

In the example above, in alternative embodiments of the invention, the age of the parent could be estimated so that the appropriate context profile for the parent could be retrieved with the child profile in anticipation of capturing gestures from the parent. That is, context profiles for all of the targets are retrieved, even if gestures have only been captured for one of the targets.

In this example, an estimated age has helped avoid a false positive from creating an alert to the security authority. Alternative embodiments of the invention use context profiles associated with old age or disability to eliminate false positives.

In other embodiments of the invention, the image recognition data is used to retrieve an individual profile which would allow an identified individual to perform recognized gestures without raising an alert. For example, suppose that the secured area was an office with a safe and an unapproved gesture for an unidentified target was opening the safe. Using the image recognition module, a context profile for the individuals allowed to open the safe can be retrieved, so that a false positive is avoided.

In preferred embodiments of the invention, false positives are reduced with automated speech recognition (ASR) and natural language processing (NLP) technologies. Using microphones associated with the stationary or mobile sensors, captured audio can be forwarded to the audio recognition module of the system. A recording of the captured audio is made, the speech recognition module interprets the audio to render it into words which can be further processed by the system. These words and/or the original audio are tagged as metadata or otherwise associated with the recognized gesture.

By supplementing the recognized gestures, the audio processing can provide more context to differentiate an approved gesture from an unapproved gesture, and thereby help avoid false positives. For example, if a "hitting" gesture was detected, but accompanied by a "laughing" sound, a false positive could be avoided. Alternatively, the audio can be used to confirm that a detected gesture is unapproved. For example, if the system had detected a giving/receiving gesture and also had an associated audio that indicates some level of negotiation (E.g., "I expect money to close the deal"), this could increase the confidence of system detection of an unapproved gesture. Yet further, the added audio information can also improve the learning phase of the invention, wherein the additional audio information is used to classify the recognized gesture as an approved gesture or an unapproved gesture.

Figure 6:
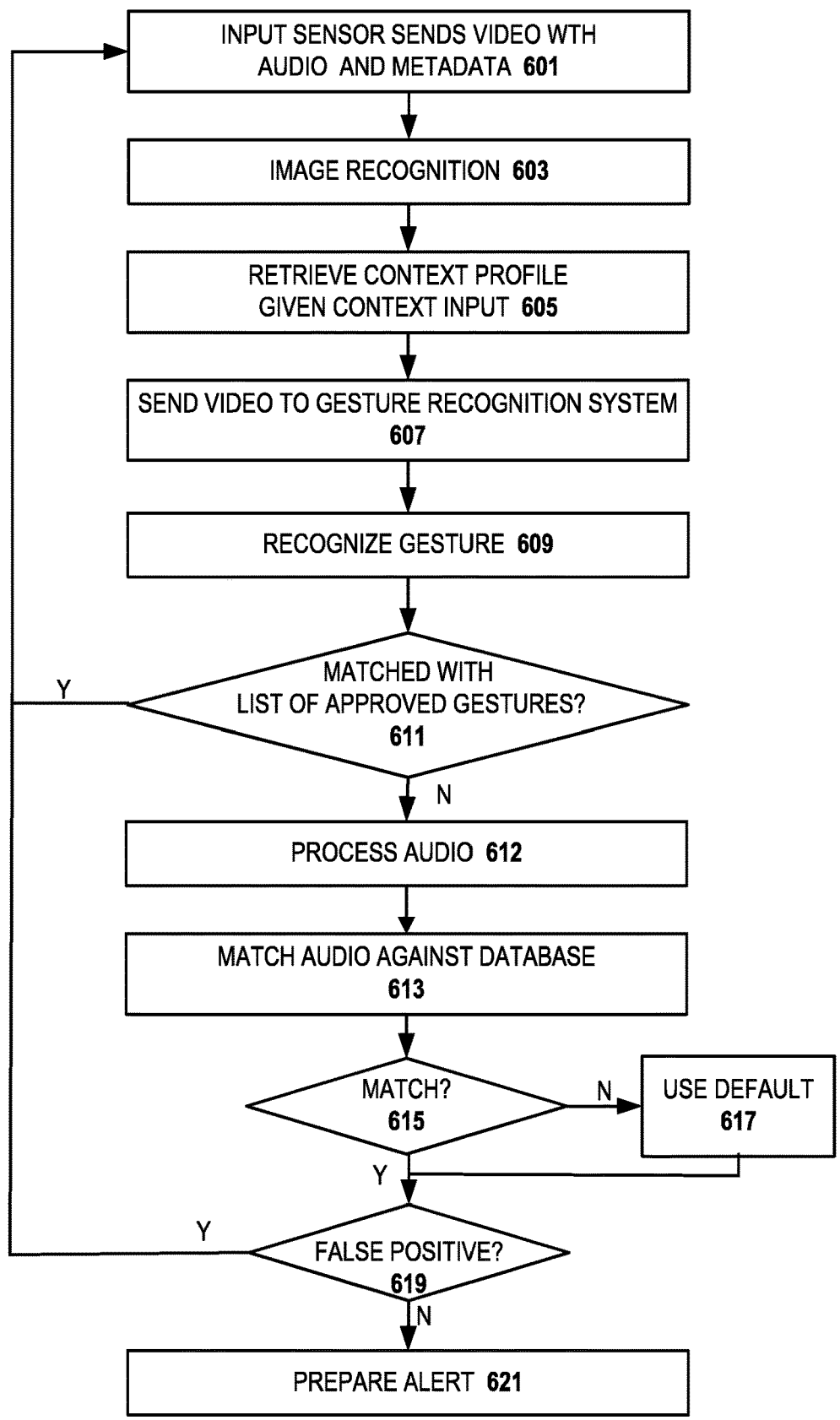
FIG. 6 is a flow diagram of a third preferred embodiment of the invention.

FIG. 6 shows one preferred embodiment of the invention in which audio information is used to avoid false positive. In step 601, the input sensor sends video/image data along with audio data as well as other metadata (e.g., location) to a processing module of the gesture recognition system. In step 603, image recognition module performs standard image recognition techniques to estimate the target(s) age, physical abilities, or to identify the individual. In step 605, the system retrieves the appropriate context profile using the discovered context inputs from the knowledge base. In this example, an "Office 101-Negotiation" context profile is retrieved from the knowledge base. In step 607, the context profile and the associated video/image stream are forwarded to the gesture recognition system.

In step 609, the gesture recognition system recognizes the gesture, for example, a target dropping an object and running away. The recognized gesture is matched with list of approved gestures from the knowledge base using the context profile, step 611. If the gesture was matched as an approved gesture, the system would return to receiving video and audio input in step 601. However, in this example, the gesture is not on the list of approved gestures. At this point, in step 612, the audio processing module processes the audio using standard NLP/ASR techniques to identify audio context. In step 613, the recognized audio is matched against an audio database to identify possible matches. In embodiments of the invention, the audio database contains a blacklist of words which are cause for sending an alert to a security authority. In other embodiments, the audio database contains a whitelist of words which provide an override to a recognized gesture. If there is no match as approved or unapproved, step 615, the default process in one preferred embodiment is to add the recognized words, audio and audio metadata to the recognized gesture before forwarding to the security authority.

In step 619, a determination is made whether a false positive has been recognized by the gesture recognition system. For example, suppose that dropping an object is an unapproved gesture. However, the audio feed recognizes that the words "Happy Birthday" (from the whitelist) were uttered by the target, and the image recognition module recognized the dropped object as a wrapped present, the recognized gesture can be designated as a false positive and be simply logged rather than be the cause of an alert.

However, if the gesture is recognized as an unapproved gesture or an unknown gesture, and the audio information indicated that the gesture was likely a cause for action, in step 621, the system will generate an alert. As above, the alert may be sent to an appropriate authority via electronic notification or alternatively the system raises alarm sounds. Thus, the audio information can not only eliminate false positives, but also increase the confidence that the gesture should be designated as approved or unapproved, or add in interpretation of an unknown gesture.

While the invention includes the use of stationary gesture input sensors or cameras, mobile gesture input sensors offer advantages to embodiments of the present invention. One disadvantage of stationary sensors is the setup cost and time; providing an initial stationary input sensor involves planning, time and money. By using mobile input sensors, for example, cameras and microphones in wearable devices and mobile phones, setup costs and time can be minimized. Ad hoc secured areas can be established in a city by a security authority in response to notification of a planned or unplanned event. The metadata from such mobile devices include, for example, a location of the device, device specific info (IMEI number) and environmental info (temperature, lighting, etc.). The mobile device metadata can be used to establish which mobile device inputs should be directed to which secured area as well as helping the gesture recognition system to discriminate between approved gestures and unapproved gestures.

Although embodiments of the invention as that pictured in FIG. 3 use dedicated computer systems for the gesture, audio and image recognition, some of these functions can be offloaded to the processors in the mobile devices. In such embodiments, rather than forwarding a raw video or audio stream back to the security system, the mobile devices would perform recognition and send back recognized gesture or audio events. Alternatively, other devices which are part of the "Internet of Things" network can be drafted on a flexible basis for processing of gesture inputs.

Figure 7:
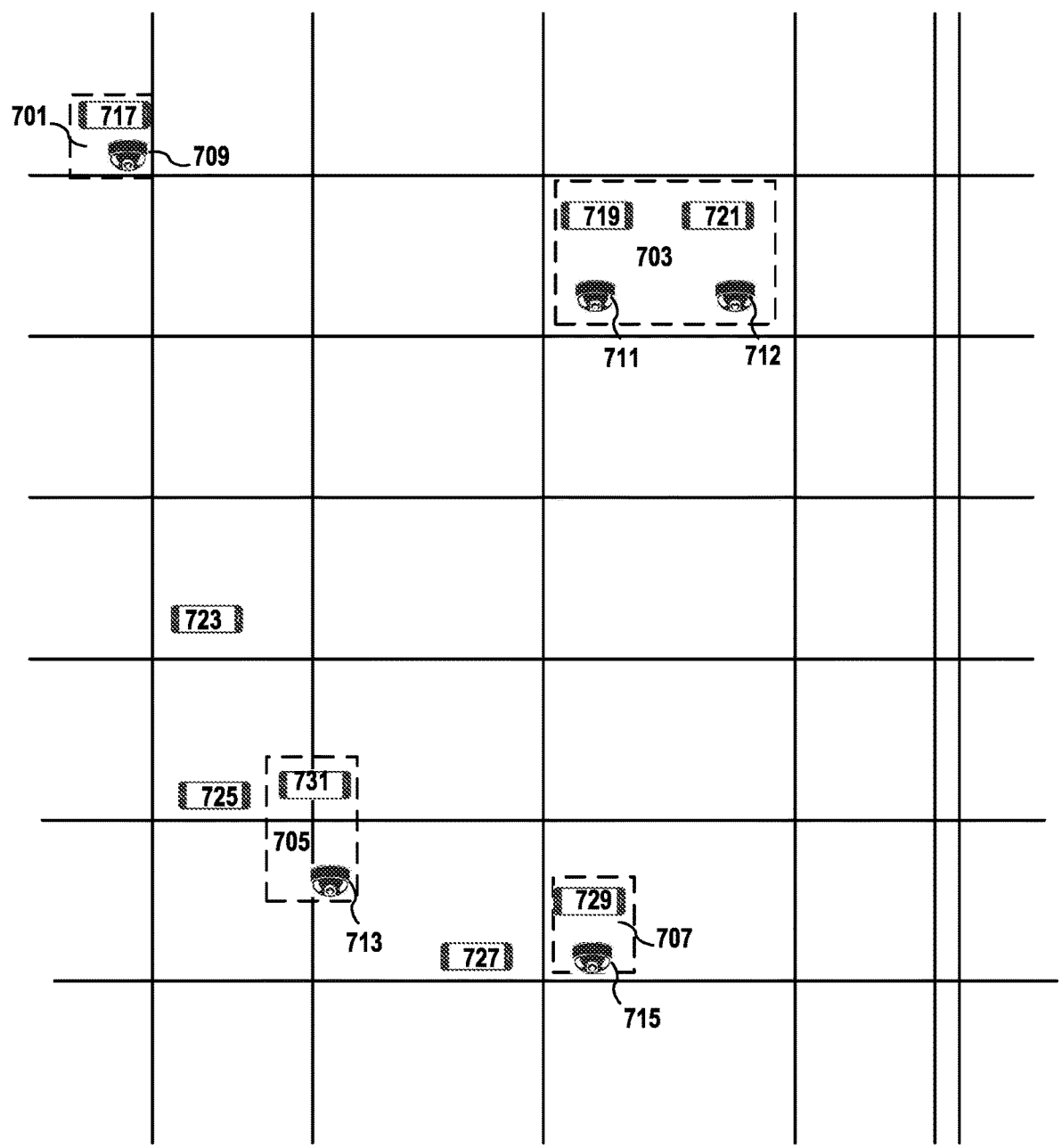
FIG. 7 is a diagram of a city view of a preferred embodiment of the invention in which a plurality of mobile devices enter and exit control areas.

As shown in FIG. 7, in preferred embodiments of the invention, a plurality of secured areas 701, 703, 705 and 707 within a geographic area can be serviced by a single gesture recognition system. In this example, Area 701 is an ATM machine and the immediate surrounding area. Area 703 is an athletic facility, Area 705 is an intersection having a high incidence of incidents and Area 707 is a daycare facility. Stationary camera 709 is placed in Area 701, stationary cameras 711 and 712 are placed in Area 703, stationary camera 713 is placed in Area 705 and stationary camera 715 is placed in Area 707. The inputs from the stationary cameras are augmented by the inputs from mobile devices which happen to be in or proximate to the respective secured area. In the drawing, mobile device 717 is the smart phone of a patron using the ATM. Mobile device 719 is a smart phone of a spectator and mobile device 721 is a wearable device worn by a security guard employed by the athletic facility. Similarly, mobile device 731 is a vehicle camera mounted on a vehicle nearing the intersection. Mobile device 729 is a camera equipped tablet used by one of the caregivers at the day care center. As is described above, each of the secured areas preferably is associated with a respective set of context profiles.

Also shown are mobile devices 723, 725 and 727 which are not currently within the boundaries of a secured area. In one preferred embodiment, the video and audio collected by these devices is discarded once the system establishes that the inputs do not belong to any current secured area by examining the location metadata. However, once the devices move within a secured area, for example, mobile device 725 moves within secured area 705, the video, audio and metadata are handled according to the set of context profiles for the appropriate secured area 705. As mobile device 725 moves outside the boundaries of secured area 705, the system begins discarding mobile device 725 inputs. Mobile device 725 continues to move and once it moves within secured area 707, the system handles the video, audio and metadata according to the set of context profiles for secured area 707. The changing location metadata is used to determine which secured area the moving mobile device's output should be directed to as well as the set of rules to use to interpret the recognized gesture, e.g., whether it is approved or unapproved.

In another preferred embodiment, an unapproved or approved gesture recognized by the system from a mobile device outside a secured area (indicated as "unapproved" or as a "trigger" gesture by using a default context profile or rule) will trigger the creation of a new ad hoc secured area. The security system will attempt to enlist other mobile devices proximate to the new secured area for additional input. When setting up an ad-hoc security area, other embodiments use an approved gesture as the trigger. Further, the security system itself may schedule an ad-hoc secured area in anticipation of a scheduled event, such as an outdoor concert or parade. The security system enlists registered mobile devices as they pass into the bounds of the new or existing secured area and discards the input from the mobile devices as they pass outside the bounds of the new or existing secured area.

As is mentioned above, embodiments of the invention only allow input from registered mobile devices to provide input. Registration gains permission from the mobile device owner in view of privacy and other laws. The registration can be refined so that the mobile device user gives permission for a defined set of secured areas, but exclude other secured areas. The registration process can provide prompts as to whether the mobile device can be enlisted in an ad-hoc security area. Finally, the registration process can contain prompts for what types of sensor data can be used for each of the secured areas for which the user has granted permission.

The format of the mobile metadata can conform to in any standard, for example, JSON, XML, and can have following attributes:

```
E.g., JSON metadata
Context: {
    Location: {
        "sensorName": "johnmobilesensor"
        "sensorID": "jm123"
        "devLocation": "RTPArea "
        "devLoclatitude": 12.969428
        "devLoclatitude": 77.596081
        "devTime": "2015-11-18T04:42:26Z"
        "devTimeFormat": "yyyy-MM-dd'T'HH:mm:ss'Z'"
        "platformName": "iOS"
        "deviceName": "iPhone"
        "DeviceID": "ApplFFMNN06SFYWF"
    }
}
```

The location metadata from mobile devices are used to distinguish gestures more effectively. For example, a law enforcing officer on monitoring duty might be wearing a device with a camera, which can provide mobile input to the system. It records video within its sphere of influence. As the officer moves in the areas served by the security system, the camera provides video input back to the system which is tagged with location metadata. For example, the wearable device picks up a recognized gesture, a sum of money being handed from one person to another. In a first location, a restaurant or store, this is a normal action and would not raise an alert. If the officer then moves to a second location, a judge's chambers, and his wearable device picks up the same gesture, a different result would occur. A sum of money being handed over to a government official within official premises may indicate a potential bribe. The gesture is marked as not normal, i.e. unapproved, and raises an alert. In this example, the gesture is giving/receiving money, and location contextual information such as restaurant or official premises distinguishes between similar gestures sensed by the same mobile device. In one location, the gestures are approved gestures, and in a second location, they are unapproved gestures.

Other types of metadata are used to discriminate between approved and unapproved gestures. Depending on the contextual information, such as age of the individual involved in the gesture act, the gesture may be classified as approved or unapproved. Age is one type of metadata that can be established by the image recognition unit, the gesture recognition unit or the audio unit. Traits such as height or facial characteristics are used by the image recognition unit to estimate age. Age can be estimated by the audio unit using data such as pitch and tone of the voice, vocabulary, enunciation and so forth. The gesture unit can identify an older subject or a younger subject based on algorithms which measure gait, speed, bone length and other parameters. Average information for a certain age, for example, how fast a typical aged person could run or how much a typical aged person can lift, etc. can also be part of the age estimation algorithm. Once the age information is estimated, it can serve as additional contextual information to process the gesture. Similar to age, other characteristics such as gender, disability or ethnic group can be estimated by the image, audio and gesture recognition units.

Gestures which do not conform to known approved or unapproved gestures can be designated by the system as anomaly or outlier gestures and given to the security authority or other expert for further investigation/forensics. The metadata associated with the outlier gestures are stored to help in post-mortem or forensic analysis. The outlier gestures are then categorized as either approved or unapproved, or suspicious, i.e. or be placed on a watch list for more information to be gathered. If the suspicious gestures do not reoccur and if they are judged to be uncommon or unlikely to be repeated can be left unclassified.

The present invention has many advantages over the prior art. By using image recognition and audio recognition technologies, the recognized gesture is more accurately classified as an approved or unapproved gesture. False positives are avoided. The image and audio data can be used to confirm the classification of a recognized gesture. The use of location data provides context to the gesture; a gesture may be classified as approved or unapproved according to location.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method for using sensor input from mobile devices in a gesture based security system which monitors a plurality of secured areas, the method comprising:
   receiving a first video feed from a camera incorporated in a first mobile device, the first mobile device communicatively coupled to the gesture based security system, the camera having a view of one of a plurality of secured areas monitored by the gesture based security system, each of the secured areas associated with a respective set of approved gestures and unapproved gestures for the secured area;
   recognizing a gesture within the first video feed;
   associating non-gesture metadata from the first mobile device with the recognized gesture;
   using the non-gesture metadata to determine that the first video feed is a current view of a first secured area of the plurality of secured areas;
   responsive to determining that the first video feed is a view of the first secured area, retrieving the set of approved gestures and unapproved gestures for the first secured area; determining that the recognized gesture is an approved gesture within the first secured area according to non-gesture metadata associated with the recognized gesture;
   detecting a video feed from a camera incorporated in a second mobile device, the second mobile device physically separate from the first mobile device and also communicatively coupled to the gesture based security system;
   recognizing a second gesture from the video feed from the second mobile device located outside a current secured area;
   determining that the second gesture is an unapproved gesture according to a default rule;
   responsive to the determining, enlisting a set of mobile devices to establish a new secured area for the gesture based security system to provide respective video feeds showing current views of the new secured area, wherein the set of mobile devices are proximate to but physically separate from the second mobile device;
   registering the first mobile device with the gesture based security system;
   detecting an image feed from the first mobile device;
   determining whether the first mobile device is a registered mobile device, wherein the first mobile device is registered in a registration process defines which sensor data will be transmitted to the gesture based security system from which secured areas; and
   responsive to a determination that the first mobile device is a registered mobile device, accepting the image feed from the first mobile device.

2. The method as recited in claim 1, wherein the non-gesture metadata is location metadata, and the method further comprises:
   using the location metadata to select a context profile for the first secured area which contains the set of approved gestures and unapproved gestures and a set of rules;
   using the location metadata to select a rule for the recognized gesture from the context profile, wherein the selected rule applies for the first secured area of the plurality of secured areas.

3. The method as recited in claim 1, further comprising:
receiving non-image based data from sensors incorporated in the first mobile device; and
converting the non-image based data into non-gesture metadata.

4. The method as recited in claim 1, further comprising:
receiving a feed of sensor data from a stationary sensor proximate to the first secured area;
converting the feed of sensor data to non-gesture based metadata;
associating non-gesture based metadata with the recognized gesture; and determining
whether the recognized gesture is an approved gesture within the first secured area according to non-gesture metadata associated with the recognized gesture, wherein the non-gesture metadata originates from sensors on both the stationary sensor and the mobile device.

5. The method as recited in claim 1, further comprising:
receiving a video feed from a third mobile device at a first time, the third mobile device physically separate from the first and second mobile devices and communicatively coupled to the gesture based security system;
determining from location metadata associated with the video feed from the third mobile device at the first time that the third mobile device is proximate to the first secured area;
determining whether the third mobile device is a registered mobile device, wherein the third mobile device is registered in a registration process which defines which sensor data will be transmitted to the gesture based security system from which secured areas;
responsive to a determination that the third mobile device is a registered mobile device and that the third mobile device allows the gesture based security system to receive video feeds from the first secured area, accepting the video feed from the third mobile device;
retrieving the set of approved gestures and unapproved gestures for the first secured area to determine that recognized gestures captured by the third mobile device are approved gestures or unapproved gestures;
recognizing a second gesture within the video feed from the third mobile device;
determining that the second recognized gesture is an approved gesture within the first secured area according to non-gesture metadata associated with the recognized gesture;
receiving a video feed from the third mobile device at a second time;
determining from location metadata associated with the video feed from the third mobile device at the second time that the third mobile device is proximate to a second secured area;
responsive to a determination that the third mobile device is a registered mobile device which does not allow the gesture based security system to receive video feeds from the second secured area, refusing the video feed from the third mobile device.

6. The method as recited in claim 5, wherein the registration process indicates that the third-mobile device allows non-video data from the second secured area, accepting non-video data from the third mobile device in the second secured area.

7. Apparatus, comprising:
a processor;
computer memory holding computer program instructions executed by the processor for improving differentiation from a gesture based security system, the computer program instructions comprising:
program code, operative to receiving a first video feed from a camera incorporated in a first mobile device, the first mobile device communicatively coupled to the gesture based security system and located outside a set of secured areas currently monitored by the gesture based system;
program code, operative to recognize a gesture within the first video feed;
program code, operative to associate non-gesture metadata from the first mobile device with the recognized gesture;
program code, operative to determine that the recognized gesture is a trigger gesture according to a default rule;
program code, responsive to determining that the recognized gesture is a trigger gesture operative to enlist a set of mobile devices to a new secured area to provide respective active video feeds showing current videos of the new secured area from each of the set of mobile devices, wherein the set of mobile devices are proximate to but physically separate from the first mobile device;
program code, operative to register the first mobile device with the gesture based security system;
program code, operative to determine whether the first mobile device is a registered mobile device, wherein the first mobile device is registered in a registration process defines which sensor data will be transmitted to the gesture based security system from which secured areas; and
program code, operative to accept the image feed from the first mobile device responsive to a determination that the first mobile device is a registered mobile device.

8. The apparatus as recited in claim 7, further comprising:
program code, operative to receive sensor data from the first mobile device;
program code, operative to convert a first set of sensor data from the first mobile device into the recognized gesture; and
program code, operative to convert a second set of sensor data from the first mobile device into the non-gesture metadata.

9. The apparatus as recited in claim 8, wherein the non-gesture metadata comprises location metadata.

10. The apparatus as recited in claim 7, wherein the non-gesture metadata comprises image recognition data.

11. The apparatus as recited in claim 10, further comprising:
program code, operative to receive an image based feed from a camera incorporated in a second mobile device from the set of mobile devices, the second mobile device communicatively coupled to the gesture based security system, the camera having a view of one of a plurality of secured areas monitored by the gesture based security system, each of the secured areas associated with a respective set of approved gestures and unapproved gestures for the secured area;
program code, operative to recognize a gesture within the feed to produce a first recognized gesture;
program code, operative to associate non-gesture metadata from the mobile device with the first recognized gesture;
program code, operative to use the non-gesture metadata to determine that the image based feed is a view of a first secured area of the plurality of secured areas;

program code responsive to determining that the image feed is a view of the first secured area, operative to retrieve the set of approved gestures and unapproved gestures for the first secured area; and determining that the first recognized gesture is an approved gesture within the first secured area according to non-gesture metadata associated with the recognized gesture.

12. A computer program product in a non-transitory computer readable medium for use in a data processing system, the computer program product holding computer program instructions executed by the data processing for improving differentiation between unapproved gestures and approved gestures in a gesture based security system, the computer program instructions comprising:

program code, operative to receive a first video feed from a camera incorporated in a first mobile device, the first mobile device communicatively coupled to the gesture based security system, the camera having a view of one of a plurality of secured areas monitored by the gesture based security system, each of the secured areas associated with a set of approved gestures and unapproved gestures for that secured area;

program code, operative to recognize a gesture within the first video feed, producing a first recognized gesture;

program code, operative to associate non-gesture metadata from the first mobile device with the recognized gesture;

program code, operative to use the non-gesture metadata to determine that the first video feed is a view of a first secured area of the plurality of secured areas;

program code responsive to determining that the first video feed is a view of the first secured area, operative to retrieve the set of approved gestures and unapproved gestures for the first secured area;

program code, operative to determine that the recognized gesture is an approved gesture within the first secured area according to non-gesture metadata associated with the recognized gesture program code, operative to detect a video feed from a second mobile device, the second mobile device physically separate from the first mobile device, located outside a current secured area and communicatively coupled to the gesture based security system;

program code, operative to recognize a second gesture from the video feed from the second mobile device;

program code, operative to determine that the second gesture is an unapproved gesture according to a default rule;

program code, responsive to determining that the second gesture is an unapproved gesture operative to enlist a set of mobile devices to a new secured area for the gesture based security system to provide respective video feeds showing current views of the new secured area, wherein the set of mobile devices are proximate to but physically separate from the first and second mobile devices;

program code, operative to register a set of mobile devices with the gesture based security system, wherein the set of mobile devices is registered in a registration process defines which sensor data will be transmitted to the gesture based security system from which secured areas; and program code, operative to accept image feeds from the registered set of mobile devices.

13. The computer program product as recited in claim 12, further comprising:

program code, operative to determine from location metadata associated with the image feed from the first mobile device that the first mobile device has moved outside the first secured area;

program code, operative to continue to receive the image feed from the first mobile device and discarding the image feed outside a secured area;

program code, operative to determine from location metadata associated with the image feed from the first mobile device that the first mobile device is proximate to a second secured area; and program code, operative to accept the image feed from the first mobile device for recognizing a set of gestures and determining whether recognized gestures are approved gestures within the second secured area according to non-gesture metadata associated with the recognized gestures.

14. The computer program product as recited in claim 13, further comprising program code, operative to select a context profile indicating whether a recognized gesture is an approved gesture in a secured area, wherein the first secured area and the second secured areas have different context profiles.

15. The computer program product as recited in claim 12, wherein the non-gesture metadata is location metadata.

16. The computer program product as recited in claim 12, further comprising:

program code, operative to determine that the recognized gesture is an unknown gesture;

program code, operative to classify the unknown gesture as a suspicious gesture; and program code, operative to log occurrences of the suspicious gesture.

* * * * *